United States Patent
Lee et al.

(10) Patent No.: US 7,861,589 B2
(45) Date of Patent: Jan. 4, 2011

(54) RING BODY AND SUPPORTING STRUCTURE OF VIBRATILE GYROSCOPE

(75) Inventors: Gwo-Shiang Lee, Taipei (TW);
Sung-Tao Lin, TaoYuan (TW);
Shih-Ping Lee, Hsinchu (TW);
Ming-Wei Chang, TaiPing (TW);
Han-Jou Li, KaoHsiung (TW);
Ming-Hsiu Hsu, NanTou (TW);
Chin-Chung Nien, Hsinchu (TW)

(73) Assignee: Industrial Technology Research Institute, Chutung Town Hsinchu (TW)

( * ) Notice: Subject to any disclaimer, the term of this patent is extended or adjusted under 35 U.S.C. 154(b) by 549 days.

(21) Appl. No.: 10/628,271

(22) Filed: Jul. 29, 2003

(65) Prior Publication Data

US 2005/0036726 A1 Feb. 17, 2005

(51) Int. Cl.
*G01P 9/04* (2006.01)
*G01C 19/00* (2006.01)

(52) U.S. Cl. .................. 73/504.13; 73/504.18
(58) Field of Classification Search .............. 73/504.02, 73/504.04, 504.08, 504.12, 504.13, 504.18
See application file for complete search history.

(56) References Cited

U.S. PATENT DOCUMENTS 3,625,067 A * 12/1971 Emslie .................... 73/504.13
4,951,508 A * 8/1990 Loper et al. ............... 73/504.13
5,450,751 A * 9/1995 Putty et al. ............... 73/504.18
6,272,925 B1 * 8/2001 Watson .................... 73/504.12
6,539,804 B1 * 4/2003 Iwata ...................... 73/504.13

* cited by examiner

*Primary Examiner*—Helen C. Kwok
(74) *Attorney, Agent, or Firm*—Tim Tingkang Xia; Morris, Manning & Martin, LLP

(57) ABSTRACT

The invention is to provide a ring body and supporting structure of a vibratile gyroscope. The ring body is a thin sheet ring body having a height. The supporting structure is provided for supporting the ring body. The supporting structure is located on two opposing edges of the ring body. The supporting structures provide axial and radial supporting forces to restrain the ring body, providing better sensitivity and capability to resist environmental vibration and noise. Additionally, a reinforcing structure surrounding the ring body is arranged at an interior surface of the ring body to raise the rigidity of the ring body and maintain an elliptical resonance mode. If the reinforcing structure si arranged as high as the ring body, then it is possible to arrange electrodes at both inner and outer sides of the ring body to raise the effective area of driving and/or sensing electrodes. Raising the effective sensing area is further beneficial to reduce the needed driving voltage and increase the signal-to-noise ratio.

18 Claims, 6 Drawing Sheets

RING BODY AND SUPPORTING STRUCTURE OF VIBRATILE GYROSCOPE

BACKGROUND OF THE INVENTION

1. Field of the Invention

The invention is to provide a ring body and supporting structure of vibratile gyroscope, and more particularly to a vibratile ring-shaped gyroscope that arranges a supporting structure at the axial side of the ring body.

2. Description of the Prior Art

A gyroscope is a device that measures a rotary angle or an angular velocity by the principle of inertia. Although the structure of a vibratile gyroscope is simple, its performance is outstanding. Since there are no rotary parts (e.g., bearing, etc.), so it is extremely suitable to be manufactured by microprocess technology. Currently, there are many kinds of micro gyroscopes on the market. Since the micro gyroscope has an advantage of low cost and a characteristic of medium, high performances with further tiny size, so it has extremely wide application range, such as: a satellite navigation and an orientation system. The micro gyroscope is a sensing element having a potential for development and commercialization.

Except the restriction of signal-to-noise ratio with respect to the signal pick-up circuit, another major factor influencing the performance (sensitivity) of the micro gyroscope is the design of its configuration. In various configurations of the vibratile gyroscope, since the ring-shaped vibratile micro gyroscope has a cyclic symmetry structure, relatively, it has a higher sensing sensitivity and an advantage of reducing an interference of surrounding vibration and an influence of temperature variation. However, under the pressure of the ring-shaped (circular) axially symmetric configuration, the performance of the ring-shaped vibratile micro gyroscope may be differentiated due to the different design of its partial structure.

Refer to FIG. 1, which shows a prior structure of a ring-shaped vibratile micro gyroscope (U.S. Pat. No. 5,450,751). The micro gyroscope 10 is arranged in a base 12 and includes: a side ring 14, a central column 15, and a plurality of semi-circular supporting structures 16 distributed divergently and equidistantly. A plurality of electrodes 13 are arranged around an outer periphery surrounding the side ring 14. The side ring 14 and supporting structures 16 are all manufactured by the techniques of micro mechanical electrical process with a high depth-to-width ratio. The structural height of the side ring 14 is the same as that of the supporting structure 16. By using different areas of the side ring 14 respectively, the micro gyroscope 10 provides the inductive areas needed by static-electrically driving and capacitance sensing electrodes. The inducing method of the micro gyroscope 10 is achieved by making different sections of the side ring 14 induced with the plural sensing/driving electrodes 13. The micro gyroscope 10 must depend upon the side ring 14 having a greater height to provide larger effective acting area. However, in the meantime of raising the height of the side ring 14, it may also accompany with the increase of structural strengths of the side ring 14 and the supporting structure 16 such that, under the operations of same static-electrically driving force and induced Coriolis force, the deformation of side ring 14 is reduced, so the structural radial deformation of micro gyroscope 10 (i.e., its sensing rate) is lowered down, and this is disadvantageous for raising its sensing sensitivity. Additionally, since the supporting structure 16 must occupy the inner side of the ring body 14, it is disadvantageous to install electrodes at an inner side and an outer side of the ring body 14 simultaneously.

There are prior arts cited, such as: "Angular Velocity Inductor" (ROC Patent No. 457370, U.S. Pat. No. 6,828,958 B1), "Angular Velocity Inducing Device" (ROC Patent No. 507077), etc., having the same structure of the above-mentioned conventional micro gyroscope 10, of which supporting structures are arranged at the inner side of the ring. Since they have substantially the same structures, repetitious description is not presented herein.

Refer to FIG. 2, which shows the structure of a ring-shaped vibratile micro gyroscope according to prior arts. The micro gyroscope 20, arranged in a base 22, is mainly comprised of ring body 24 and plural supporting structures 26. The main difference between this structure and the prior structure of FIG. 1 in the aspect of structural configuration is that the supporting structure 26 is divergently distributed around the ring body 24, so the radial area of entire micro gyroscope 20 is expanded; therefore, it occupies a larger space.

SUMMARY OF THE INVENTION

According to the shortcomings of the prior arts, the main objective of the invention is to provide a ring body and a supporting structure of a vibratile gyroscope. The supporting structures are located at an axial side of the ring body and connect the ring body and the base for providing axial and radial supporting capabilities. The main vibratile ring body is restrained, such that it possesses preferable sensing sensitivity and capability to resist environmental vibration and noise.

The secondary objective of the invention is to provide a ring body and supporting structure of vibratile gyroscope, wherein a reinforcing structure is arranged at inner side and/or outer side of the ring, such that the partial rigidity of the ring body is enhanced to maintain an elliptical resonance mode.

Another objective of the invention is to provide a ring body and supporting structure of vibratile gyroscope, of which supporting structure is arranged at axial side of the ring, so it is advantageous to arrange electrodes at inner and outer sides of the ring to increase the effective sensing areas of the electrodes and the ring body hence enforces the capabilities of driving and sensing signals.

The further another objective of the invention is to provide a ring body and supporting structure of vibratile gyroscope, of which supporting structure is arranged at axial side of the ring, such that the occupying area of the ring-shaped gyroscope may be reduced.

DETAILED DESCRIPTION OF THE PREFERRED EMBODIMENTS

Figure 1:
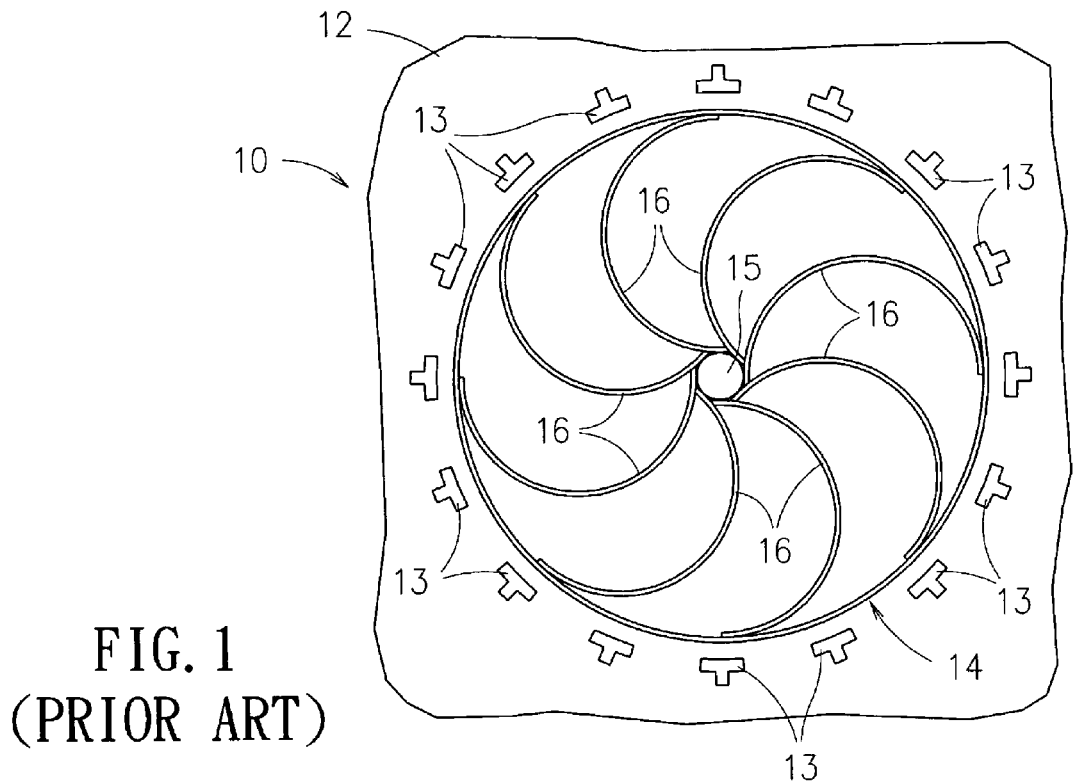
FIG. 1 is a structural illustration of a micro gyroscope according to prior art.
Figure 2:
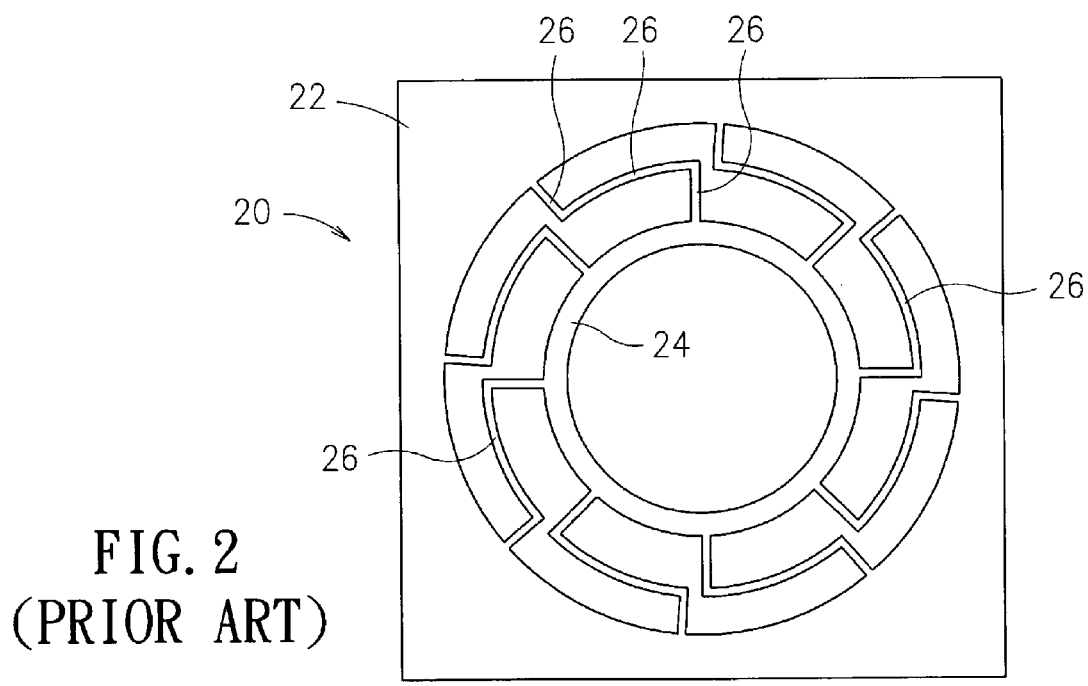
FIG. 2 is a structural illustration of another gyroscope according to prior art.
Figure 3:
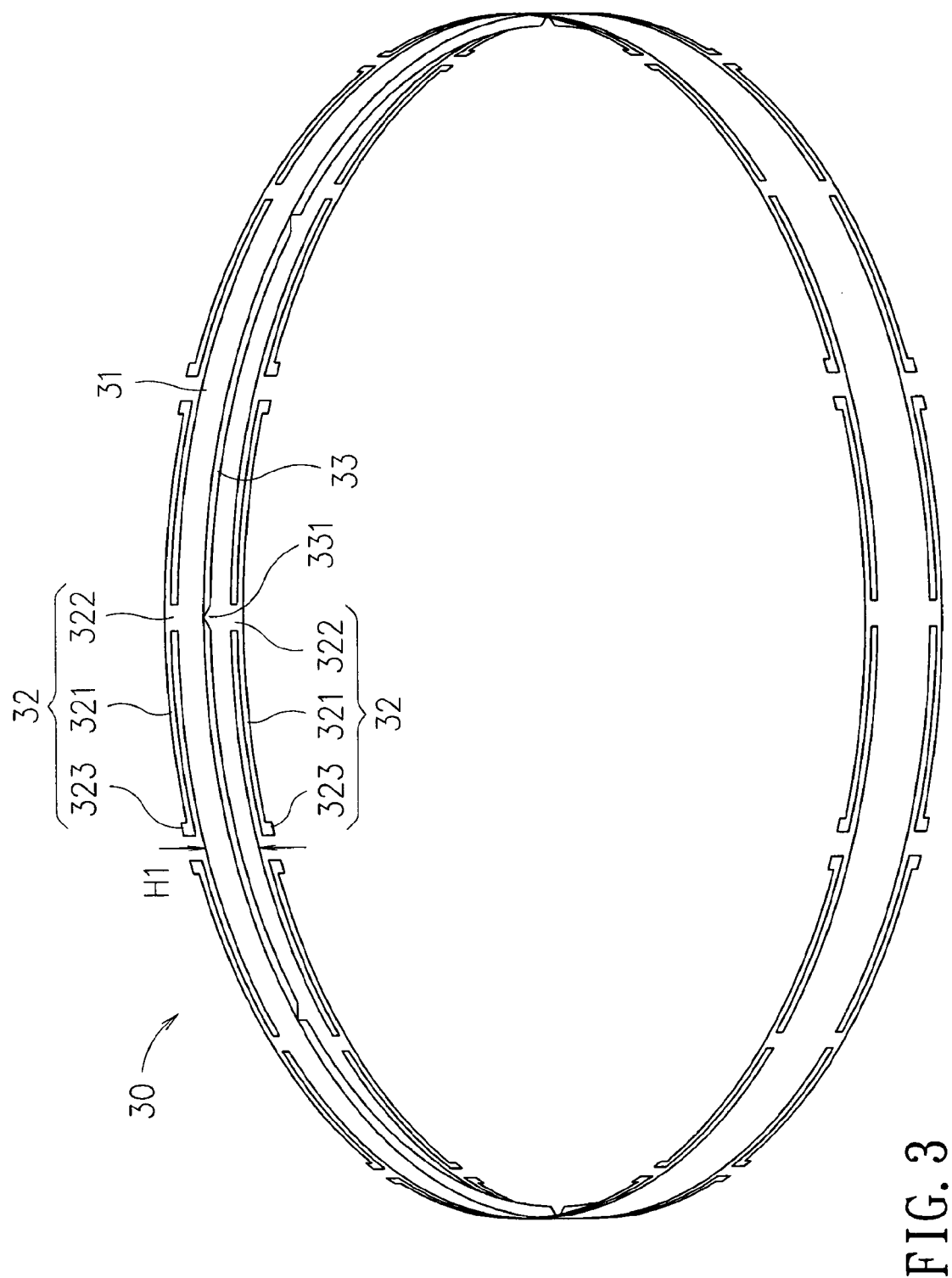
FIG. 3 is a 3-D view of the outer appearance of a gyroscope according to the invention.
Figure 4A:
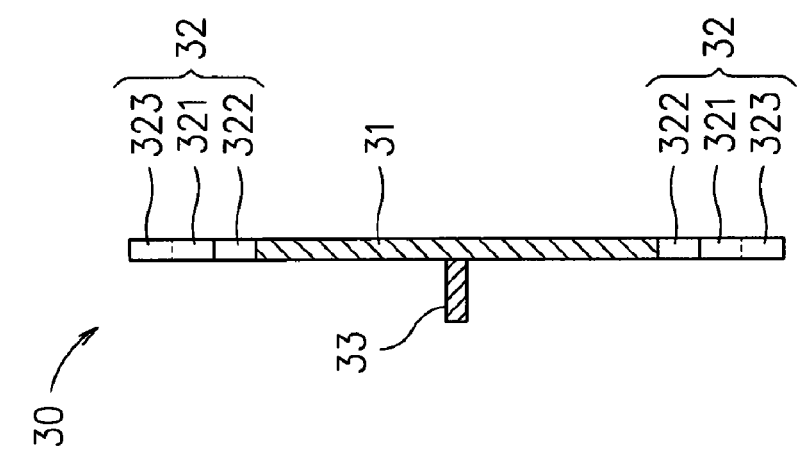
FIG. 4A is the A-A cross-sectional view of FIG. 4 according to the invention.
Figure 4:
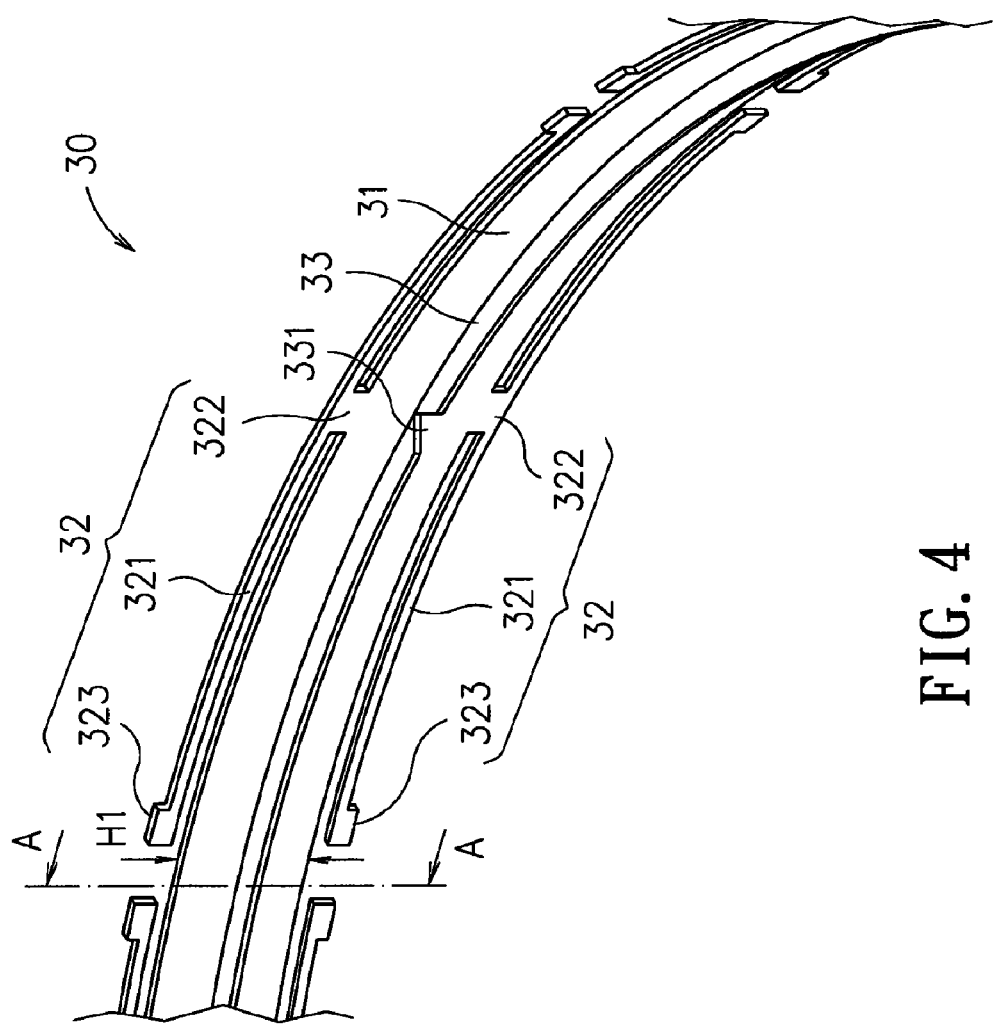
FIG. 4 is a 3-D view of the partial outer appearance of a gyroscope according to the invention.

Refer to FIG. 3 through FIG. 4A, which show a ring body and supporting structure of a vibratile gyroscope according to the invention. The vibratile ring-shaped gyroscope 30 is arranged in a base, which is arranged in carriers, such as: a satellite navigation and an orientation system, etc. To show the structure of the vibratile ring-shaped gyroscope 30 clearly, the base is not shown. The vibratile ring-shaped gyroscope 30 includes a ring body 31 and supporting structures 32. The ring 31 body is a sheet-shaped circular ring having an axial height H1. The supporting structure 32 is arranged at two opposing edges of the ring body 31. The supporting structure 32 is constructed by equidistantly arranging a plurality of arc bodies 321 having a same radius as that of the ring body 31 on top and bottom edges of the ring body 31. Surrounded by the arc bodes 321, a ring-shaped contour is constructed. At least one connecting part 322 is located between each arc body 321 and the ring body 31. Each connecting part 322 integrally fixes the arc body 321 to the ring body 31. A connecting part 323 is respectively located on each of two opposing ends of the arc bodies 321 on a side opposite the ring 31. The arc body 321 is fixedly connected to the base by each connecting part 323, such that the entire vibratile ring-shaped gyroscope 30 may be arranged in the base. Since the ring body 31 is connected to the arc bodies 321 through the connecting parts 322, the ring body 31 is fixed between two upper and lower supporting structures 32 in a suspending arm type, so restrains the ring body 31 from upward and downward motions, and it is possible to maintain the ring body 31 to have a predetermined radial deformation and vibration.

In order to promote a partial rigidity of the ring body 31 and maintain an elliptical resonance mode, a reinforcing structure 33 is arranged on an interior surface of the ring body 31. The reinforcing structure 33 is a fin-like structure projecting radially inward with a equal width from a center of the interior surface of the ring body 31. Corresponding to the connecting part 322 between the arc body 321 and the ring body 31, the reinforcing structure 33 has a recessing part 331 that is shown as an opening gradually diverging outwardly from the ring 31 in the radial direction.

Figure 5:
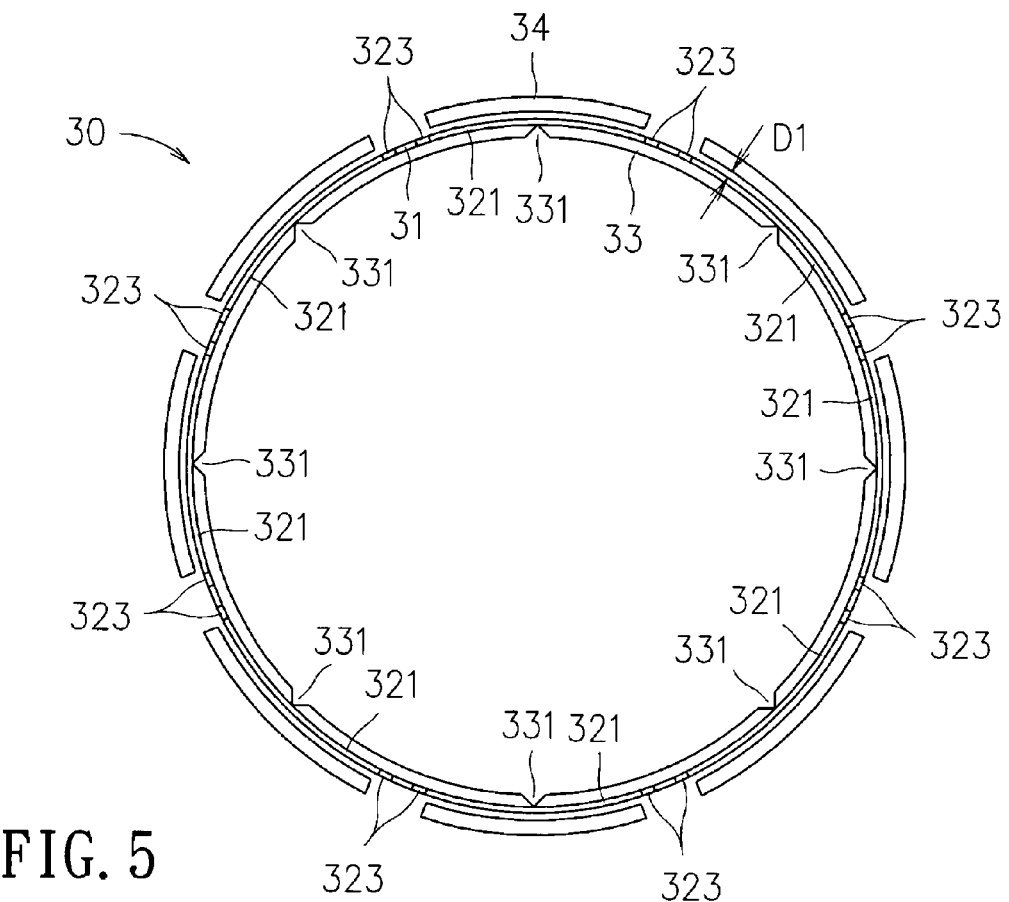
FIG. 5 is a top view of the gyroscope according to the invention.
Figure 6:
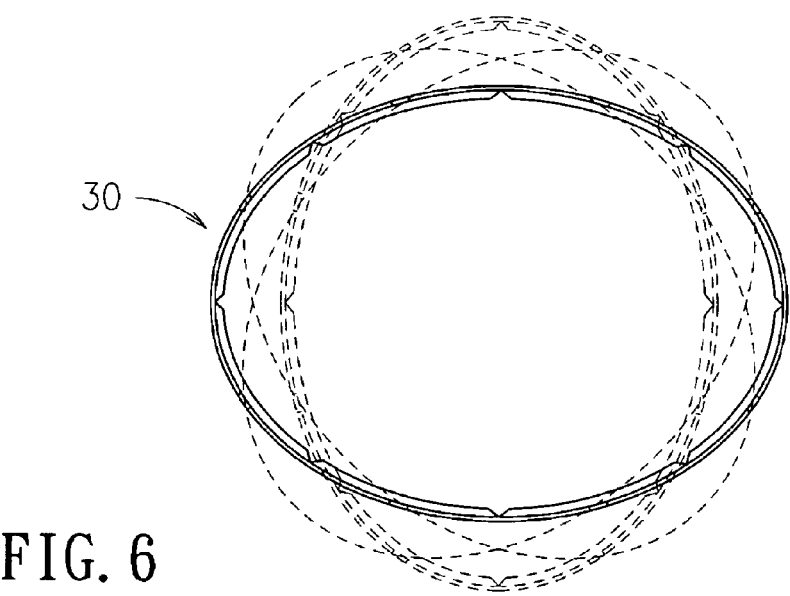
FIG. 6 is a vibratile illustration of the gyroscope according to the invention.

Refer to FIG. 5, wherein the vibratile ring-shaped gyroscope 30 has a circular ring body 31. There are eight sections of arc bodies 321 arranged on each of the top and the bottom and equidistantly spaced around a periphery of the ring body 31. A fin-like reinforcing structure 33 is located on the interior surface of the ring body 31. Corresponding to the center of the arc body 321, each reinforcing structure 33 has the recessing part 331. Corresponding to the location of the recessing part 331, a plurality of electrodes 34 are arranged around an outer periphery of the ring body 31. The electrode 34 and the ring body 31 are spaced apart a distance D1. When the ring body 31 generates an elliptical resonance mode with 45 degrees difference due to the operation of Coriolis force, the reinforcing structure 33 may enhance the partial rigidity for the ring body 31. By arranging the recessing part 331, it is easy to maintain the device in elliptical resonance mode. During an operating state, the deformation of the ring body 31 may be extremely small. To clearly demonstrate the elliptical resonance mode of the ring body 31, shown in FIG. 6, the ring body 31 is compressed intentionally. Thereby, the value of capacitance is changed due to the variation of the spacing distance D1 sensed by electrodes 34, so it may obtain the tilt or rotary angular velocity of the carriers that are installed with the vibratile ring-shaped gyroscope 30. Additionally, the spacing distance D1 arranged between the electrode 34 and the ring body 31 is an optimal spacing distance designed according to the vibratile ring-shaped gyroscope 30. The spacing distance D1 may make the ring body 31 and the electrodes 34 have a closest distance that will keep from touching the electrodes 34 when the ring body 31 vibrates.

Figure 7:
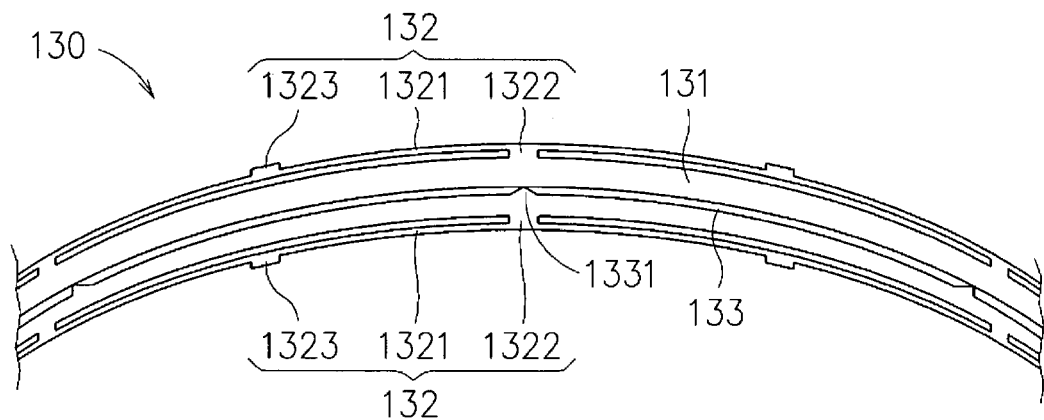
FIG. 7 is a 3-D view of the outer appearance of another preferable embodiment according to the invention.

Refer to FIG. 7, wherein the vibratile ring-shaped gyroscope 130 includes a ring body 131 and supporting structures 132 arranged on a top and a bottom of the ring body 131. The supporting structure 132 includes a continuous ring-shaped body 1321. There is a plurality of connecting parts 1322 arranged equidistantly between the ring-shaped body 1321 and the ring body 131. A connecting part 1323 is located above and below each center point located between two adjacent connecting parts 1322 of the plurality of connecting parts 1322. Each connecting part 1323 may connect the ring-shaped body 1321 fixedly to the base (not shown in the figures). Therefore, because the entire vibratile ring-shaped gyroscope 130 is arranged in the base. Since the ring body 131 is connected to the ring-shaped body 1321 by the connecting part 1322 fixing the ring body 131 between upper and lower supporting structures 132 with a suspending arm type, the ring 131 has a specific allowance of radial deformation and vibration.

To enhance the partial rigidity of the ring body 131 and maintain an elliptical resonance mode, there is a reinforcing structure 133 located on an interior surface of the ring body 131. The reinforcing structure 133 is a fin-like structure projecting radially inward an equal width from a center of the interior surface of the ring body 131. Corresponding to the connecting part 1322 between the arc body 1321 and the ring body 131, the reinforcing structure 133 is arranged recessing part 1331 that is shown as opening gradually diverging outwardly from the interior of the ring body 131.

Figure 8:
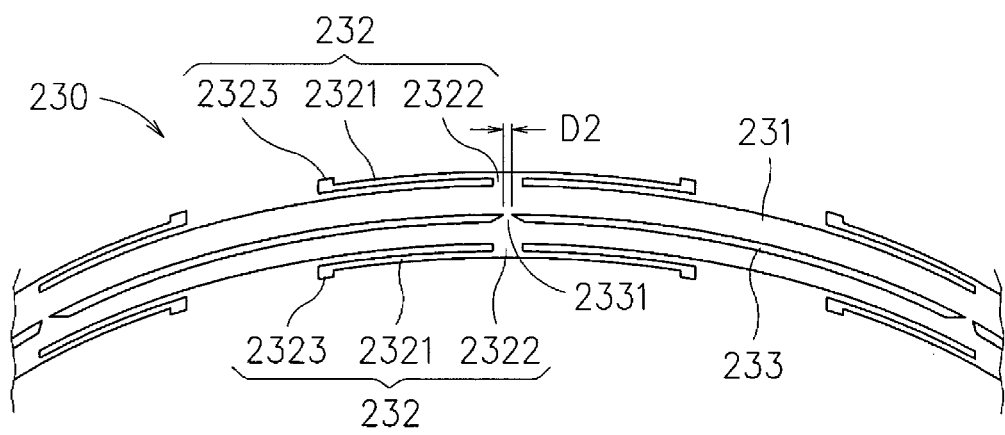
FIG. 8 is a 3-D partial view of further preferable embodiment according to the invention.

Refer to FIG. 8. The structure of this vibratile ring-shaped gyroscope 230 is substantially the same as that of the embodiment of FIG. 4. The vibratile ring-shaped gyroscope 230 is comprised of a ring body 231 and a supporting structure 232 extending from a top and a bottom edge of the ring body 231. The supporting structure 232 is constructed by equidistantly arranging a plurality of arc bodies 2321 having a same radius as that of the ring body 231 on a top and a bottom thereof. Surrounded by the arc bodies 2321, a ring-shaped contour is constructed. The length of each arc body 2321 is slightly shorter than that of the arc body 321 shown in FIG. 4. At least one connecting part 2322 is arranged between each arc body 2321 and the ring body 231. THE connecting part 2322 may make the arc body 2321 connected integrally to the ring body 231. A connecting part 2323 is further arranged respectively at two ends of each arch body 2321 on a side of the arc body 2321 opposite the ring body 231. By connecting the arc body 2321 securely to the base (not shown in the figure) by the connecting part 2323, the entire vibratile ring-shaped gyroscope 230 may be arranged in the base. The ring body 231 is connected to the arc body 2321 by the connecting part 2322, such that the ring body 231 is fixed between upper and lower supporting structures 232 in a suspending arm type, so that the ring body 231 is restrained from upward and downward motions, wherein the ring body 231 has a predetermined radial deformation and vibration. To promote the partial rigidity of the ring body 231 and maintain an elliptical resonance mode, a reinforcing structure 233 is arranged on the interior surface wall of the ring body 231. The reinforcing structure 233 is a fin-shaped structure radially projecting outwardly with equal width from a center of the interior surface of the ring body 231. Corresponding to the connecting part 2322 between the arc body 2321 and the ring body 231, the reinforcing structure 233 has a recessing part 2331 shown as an opening gradually diverging outwardly from the ring body 231. The difference between this recessing part 2331 and the recessing part 331 shown in FIG. 4 is that each reinforcing structure is spaced apart a distance D2 at each recessing part 2331 and ring body 231 forms a spacing distance D2 at the inner side wall of the ring body 231 such that, when the ring body 231 generates elliptical resonance mode, two adjacent reinforcing structures 233 on opposing sides of the recessing part 2331 will not interfere with each other.

Figure 9:
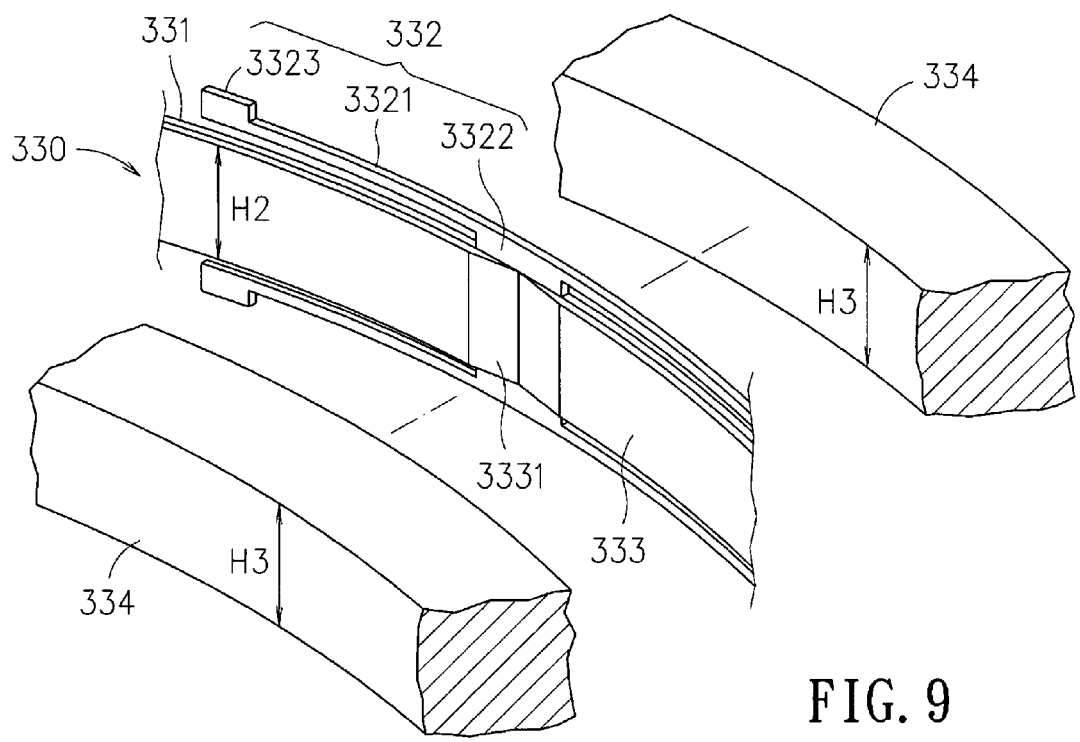
FIG. 9 is a 3-D view in which a partial structure of further another preferable embodiment according to the invention incorporates electrodes.
Figure 10:
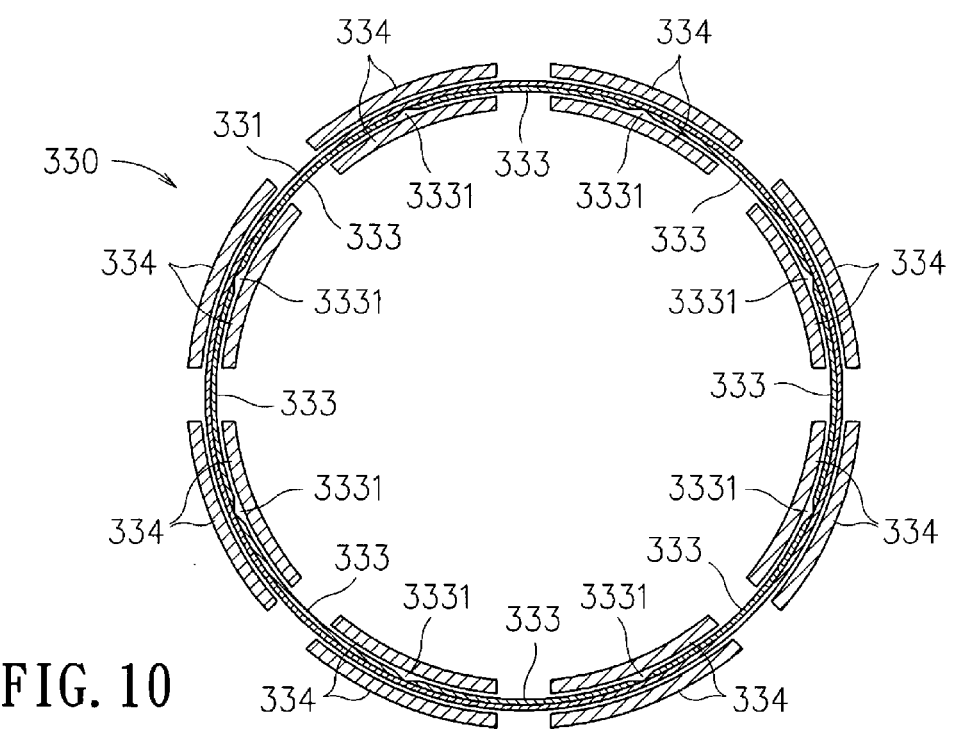
FIG. 10 is an axially cross-sectional view of the embodiment of FIG. 9.

Refer to FIG. 9 and FIG. 10, wherein the vibratile ring-shaped gyroscope 330 is comprised of a ring body 331 and supporting structures 332 arranged on top and bottom edges of the ring body 331. The supporting structure 332 is constructed by a plurality of arc bodies 3321, having the same radius as that of the ring body 331, arranged equidistantly on each of the top and the bottom edges of the ring body 331. Also see FIG. 3. The continuous ring-shaped body 1321 shown in FIG. 7 may replace the arc body 3321 in FIG. 9. Their achievable functions are the same. At least one connecting part 3322 is arranged between each arc body 3321 and the ring body 331. The connecting part 3322 integrally connects the arc body 3321 to the ring body 331. A connecting part 3323 is arranged respectively at each of two opposing ends of one side of the arc body 3321 opposite the ring body 331. The connecting part 3323 connects the arc body 3321 securely to the base (not shown in the figures). Therefore, the entire vibratile ring-shaped gyroscope 330 is arranged in the base. Since the ring body 331 is connected to the arc body 3321 by the connecting part 3322 fixing the ring body 331 between both upper and lower structures 332 in suspending arm type, so it my restrain the ring body 331 from upward and downward motions, but it may still maintain the ring body 331 to have a radial deformation and vibration with specific allowance.

To promote the partial rigidity of the ring body 331 and maintain an elliptical resonance mode, a reinforcing structure 333 is arranged on interior surface of the ring body 331. The characteristic of the reinforcing structure 333 is that the reinforcing structure 333 is a full-height type and has a height H2 same as that of the ring body 331, such that the reinforcing structure 333 may cover the inner side wall of the ring body 331. Corresponding to the connecting part 3322 of both arc body 3321 and ring body 331, the reinforcing structure 333 has a recessing part 3331 shown as opening diverging outwardly from an interior of the ring body 331. One characteristic of this embodiment is that, corresponding to the recessing part 3331, electrodes 334 may be arranged on the interior and/or an exterior surface of the ring body 331. The electrode 334 has a height H3 that is same as the height H2 of both ring body 331 and reinforcing structure 333. Thereby, the electrode 334 and the ring body 331 have a fully driving and sensing effective area. The promotion of effective inducing area is beneficial to lower down the needed driving voltage (energy) and increase the sensing signal-to-noise ratio simultaneously. Furthermore, since electrodes 334 may be arranged at both inner and outer sides of the ring body 331, so the driving and sensing efficacy of the invention is almost twice as large as that of the traditional device that arranges electrode at only one side.

In summary, the invention has a supporting structure above and below the ring body. Thereby, axial and radial supporting forces are provided between the ring body and the base to restrain the main vibratile ring body, such that the gyroscope according to the invention has preferable sensing sensitivity and a capability to resist environmental vibration and noise. In addition, reinforcing structures are arranged on the interior surface of the ring body to promote the partial rigidity of the ring body and maintain an elliptical resonance mode. If the reinforcing structure is arranged as high as the ring body, then it is possible to arrange electrodes inside and outside the ring body to promote its driving and sensing efficacy, so the invention obviously possesses the novelty and industrial applicability; however, the above descriptions are only preferable embodiments of the invention an can't be regarded as the limitation of the invention, so any equivalent variation and modification made by those who are skilled in the arts according to the appended claims of the invention still posses the merits of the invention and also don't depart for the spirits and scopes of the invention, so they should all be regarded as further executing situations according to the invention.

What is claimed is:

1. A ring body and supporting structure of a vibratile gyroscope, comprising:
    a sheet ring body having a thickness;
    a supporting structure located on each of a top and a bottom edge of the sheet ring body and supporting the ring body; and
    a plurality of electrodes located at a position selected from a group consisting of an interior of the ring body, an exterior of the ring body, and an interior and an exterior of the ring body sensing a deformation of the ring body and driving the ring body;
    wherein the supporting structure is arranged at an axial side of the ring body and having a radius similar to the ring body, and is connected to the ring body at equally space points around the ring.

2. The ring body and supporting structure of the vibratile gyroscope according to claim 1, wherein the supporting structure is symmetrically arranged on two opposing edges of the ring body.

3. The ring body and supporting structure of the vibratile gyroscope according to claim 1, wherein the supporting structure is a ring shape and has an inner radius and an outer radius equal to an inner radius and an outer radius of the ring body, respectfully, and a plurality of connecting parts located between the supporting structure and the ring body.

4. The ring body and supporting structure of the vibratile gyroscope according to claim 3, wherein the supporting structure having a plurality of arc bodies having a common radius.

5. The ring body and supporting structure of the vibratile gyroscope according to claim 4, wherein the plurality of arc bodies includes eight arc bodies being equally spaced, each of the eight arc bodies having one of the plurality of connecting parts located on a first edge thereof and having one of the plurality of connecting parts located on a second edge thereof.

6. The ring body and supporting structure of the vibratile gyroscope according to claim 3, wherein the supporting structure is a continuous ring-shaped body having the plurality of connecting parts equally spaced apart on a top and bottom thereof.

7. The ring body and supporting structure of the vibratile gyroscope according to claim 1, further comprising a reinforcing structure located on an interior surface of the ring body.

8. The ring body and supporting structure of the vibratile gyroscope according to claim 7, wherein the reinforcing structure projects inwardly from the interior surface of the ring body, and the reinforcing structure having a plurality of recessing parts.

9. The ring body and supporting structure of the vibratile gyroscope according to claim 8, wherein each of the plurality of recessing parts is an opening diverging outwardly from the interior surface of the ring body, and the recessing parts are equally spaced.

10. The ring body and supporting structure of the vibratile gyroscope according to claim 7, wherein the reinforcing structures have a height equal to a height of the ring body.

11. The ring body and supporting structure of the vibratile gyroscope according to claim 1, wherein the ring body is a sheet-typed ring body having a height, and the supporting structure is a ring structure having an inner radius and an outer radius equal to an inner radius and an outer radius of the ring body, respectfully, and a plurality of connecting parts are located between the supporting structure and the ring body.

12. The ring body and supporting structure of the vibratile gyroscope according to claim 11, wherein the supporting structure has a ring-shaped contour and includes a plurality of surrounding arc bodies having a common radius.

13. The ring body and supporting structure of the vibratile gyroscope according to claim 12, wherein the plurality of arc bodies includes eight arc bodies being equally spaced, each of the eight arc bodies having one of the plurality of connecting parts located on a first edge thereof and having one of the plurality of connecting parts located on a second edge thereof.

14. The ring body and supporting structure of the vibratile gyroscope according to claim 11, wherein the supporting structure is a continuous ring-shaped body having the plurality of connecting parts equally spaced apart on a top and a bottom thereof.

15. The ring body and supporting structure of the vibratile gyroscope according to claim 11, further comprising a reinforcing structure located on an interior surface of the ring body.

16. The ring body and supporting structure of the vibratile gyroscope according to claim 15, wherein the reinforcing structure projects inwardly from the interior surface of the ring body, and the reinforcing structure having a plurality of recessing parts.

17. The ring body and supporting structure of the vibratile gyroscope according to claim 16, wherein each of the plurality of recessing parts is an opening diverging outwardly from the interior surface of the ring body, and the recessing parts are equally spaced.

18. The ring body and supporting structure of the vibratile gyroscope according to claim 15, wherein the reinforcing structures have a height equal to a height of the ring body.

* * * * *